(12) United States Patent
Van Den Berghe

(10) Patent No.: US 7,918,157 B2
(45) Date of Patent: Apr. 5, 2011

(54) PRODUCTION OF EXPANDED FOOD CRACKERS

(75) Inventor: René Van Den Berghe, Brakel (BE)

(73) Assignee: Incomec-Cerex NV, Brakel (BE)

( * ) Notice: Subject to any disclaimer, the term of this patent is extended or adjusted under 35 U.S.C. 154(b) by 1073 days.

(21) Appl. No.: 10/587,457

(22) PCT Filed: Feb. 2, 2005

(86) PCT No.: PCT/EP2005/001113
§ 371 (c)(1),
(2), (4) Date: Jul. 27, 2006

(87) PCT Pub. No.: WO2005/074727
PCT Pub. Date: Aug. 18, 2005

(65) Prior Publication Data
US 2007/0160733 A1 Jul. 12, 2007

(30) Foreign Application Priority Data

Feb. 3, 2004 (EP) .................................... 04075319

(51) Int. Cl.
*A23L 1/18* (2006.01)
*A23P 1/14* (2006.01)
(52) U.S. Cl. ................. 99/353; 99/349; 99/372; 99/439
(58) Field of Classification Search .................. 426/618, 426/549, 520–523, 242; 99/326–336, 352–356, 99/483, 372–379, 450.1–451, 349, 380, 381
See application file for complete search history.

(56) References Cited

U.S. PATENT DOCUMENTS

| 4,325,626 A * | 4/1982 | Murata et al. ................. 399/159 |
| 4,328,741 A * | 5/1982 | Yoshikazu ....................... 99/332 |
| 4,390,264 A * | 6/1983 | Murata et al. ................... 399/75 |
| 4,444,386 A * | 4/1984 | Murata et al. ................. 271/127 |
| 4,667,588 A * | 5/1987 | Hayashi .......................... 99/372 |
| 4,734,289 A | 3/1988 | Yamaguchi et al. |
| 4,888,180 A * | 12/1989 | Wu .............................. 426/618 |
| 4,965,081 A * | 10/1990 | Lazarus ....................... 426/242 |
| 5,102,677 A * | 4/1992 | Van Den Berghe ........... 426/446 |
| 5,376,395 A * | 12/1994 | Pels ............................. 426/446 |
| 5,467,693 A | 11/1995 | Van den Berghe |
| 5,562,021 A | 10/1996 | Slanik |
| 5,755,152 A * | 5/1998 | Menzin .......................... 99/353 |
| 2003/0029325 A1* | 2/2003 | Dantlgraber .................... 99/353 |

FOREIGN PATENT DOCUMENTS

EP 0367031 A2 5/1990
(Continued)

*Primary Examiner* — Reginald L Alexander
(74) *Attorney, Agent, or Firm* — Shlesinger, Arkwright & Garvey LLP

(57) ABSTRACT

The invention provides in an improved pressure-baking apparatus for producing puffed crackers from a starch-containing. cereal or other food material, thereby allowing better control of expansion resp. product consistency for an enlarged range of crackers types, materials and shapes. Accordingly the apparatus has a baking mold comprises the combination of a fixed upper die plate (1,2), a lower punch plate (3,4) directly driven and supported by a cylinder/pistion unit (10), and therebetween a peripheral mold plate (6) comprising die holes (7) in registry with said upper dies (2) and lower punches (4), said peripheral plate being selectively movable in the vertical direction between said fixed upper die plate and driven lower punch plate. An hydraulic power system (11,17) integral with the apparatus is linked with drive unit (10).

6 Claims, 8 Drawing Sheets

| | FOREIGN PATENT DOCUMENTS | | |
|---|---|---|---|
| EP | 0499301 A2 | 8/1992 | |
| EP | 1025764 A1 | 8/2000 | |
| WO | WO8800797 A1 | 2/1988 | |
| WO | WO03068005 A1 | 8/2003 | |

* cited by examiner

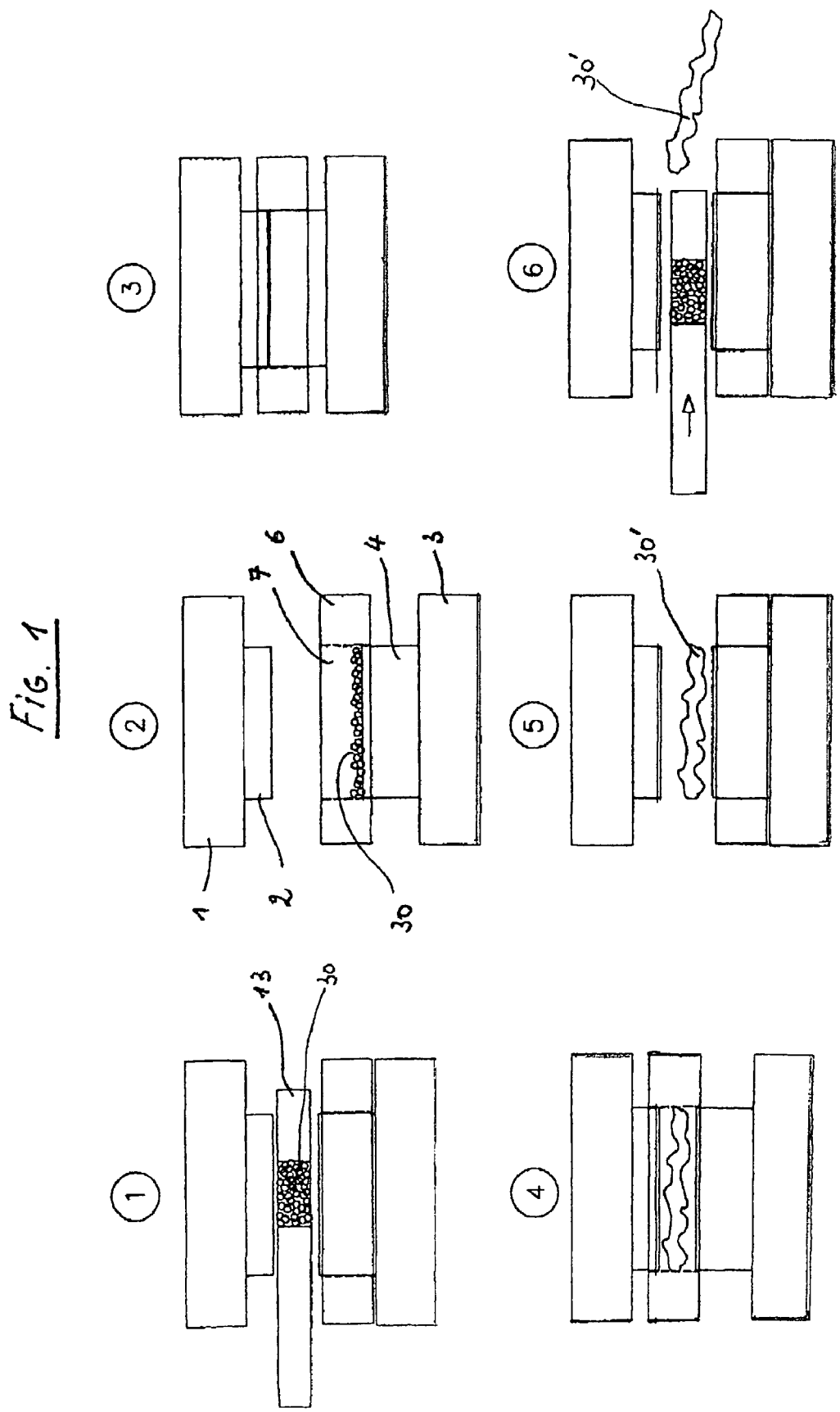

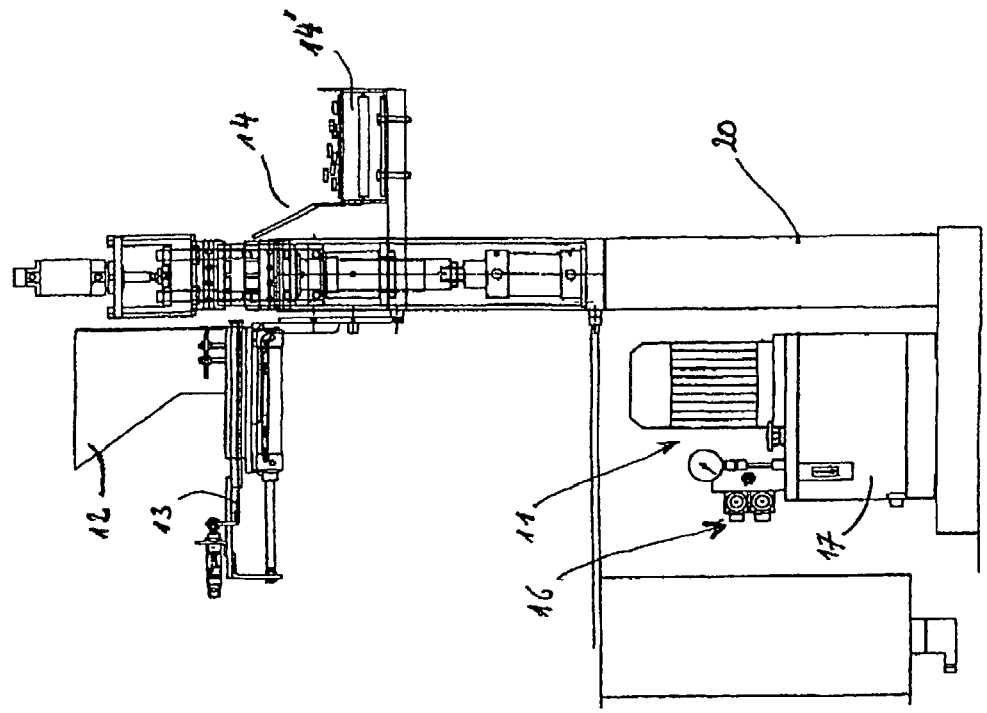
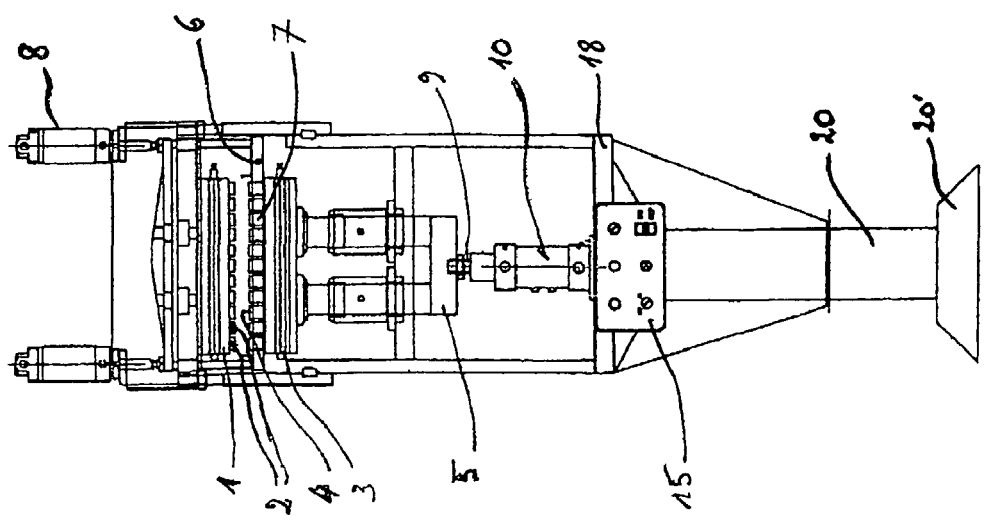

PRODUCTION OF EXPANDED FOOD CRACKERS

FIELD OF THE INVENTION

The present invention relates to the production of puffed food of the type expanded crackers of desired shape and dimensions obtainable by pressure-baking a cereal raw material, mixtures of cereals and other food raw materials which all contain a suitable amount of expandable starch. The raw material may include whole grains, crushed grains or broke, pretreated material such as steamed or pre-gelatinized grains, inclusive milled grains and admixtures thereof in the form of pellets comprising a desired starch or gelatinous constituent selected from corn, wheat, rice, barley, soy, potato etc.

BACKGROUND OF THE INVENTION

Pressure-baking and expanding a starch-containing raw food material into puffed crackers, cakes, mini-cakes and similar snacks, which is usually carried out between the heated dies of a closable mould, has now become a standard technology in the field of manufacturing health-promoting nutrition products of low fat content with appropriate amounts of protein and carbohydrates. Production processes and apparatuses for puffed crackers are disclosed in numerous patent publications such as e.g. U.S. Pat. No. 4,328,741, U.S. Pat. No. 4,667,588, U.S. Pat. No. 4,734,289, U.S. Pat. No. 4,888,180, U.S. Pat. No. 5,102,677, U.S. Pat. No. 5,376,395, U.S. Pat. No. 5,467,693, U.S. Pat. No. 5,562,021, U.S. Pat. No. 5,755,152, EP-A-0367031, WO-A-88/00797, EP-A-0499301, EP-A-1025764 etc. Each one of said documents teaches specific apparatus designs and/or process variations for improving particular aspects of puffed cracker manufacture.

In addition there have been made various proposals to render the taste, texture and shape of the puffed crackers more amenable to consumer preferences. However, conventional technology often fails to produce a consistent product at acceptable economics and known machinery is mostly not capable of producing crackers of widely varying expansion degree and base shapes or textures differing too much.

The instant inventor, having examined the different ways of prior art cracker processing, came to the conclusion that the existing methods and devices of commercial importance still had room for improvement with respect to control and effectiveness of the baking-expansion cycle, in particular its adjustment and fine-tuning according to required product type. The aim of better expansion control is generally the provision of a more reliable production method in terms of cracker quality, yield and machine productivity. However, more recent and special cracker products are deemed to involve more closely controlled and adaptable baking-expansion cycles, which cannot be performed with standard technology or at least not in optimal conditions. Therefore, there is a need to provide production methods and apparatuses having the ability and the flexibility to produce, in a consistent way, quite different requirements of puffed crackers in terms of shape, density and cereal or starch base compositions. In this way special consumer preferences regarding desired combinations of cracker properties (including crispness, taste, density, shape stability, texture etc.) could be developed and incorporated into different particular cracker qualities.

To achieve this goal there is apparently a need for further apparatus improvements and adequate process innovations, which up to now have not addressed or suggested in the prior art.

In this connection patent U.S. Pat. No. 5,102,677 discloses an improved drive system comprising a toggle mechanism actuated by a hydraulic jack having its driven shaft arranged in a nearly horizontal position to the side of the toggle member. Said document also describes a three-part mould with fixed upper die and moveable ring die.

Document U.S. Pat. No. 5,376,395 to Pels is directed to a baking-expansion system using a fixed mould ring receiving at opposite mould entries a moveable upper die and a moveable lower die, thereby allowing a pressure relief of the mould cavity as a pre-expansion step. The dies are arranged in a vertical alignment of their support axis and driven shaft without specifying the drive system.

Document EP-A-1025764 to Quaker describes a process for manufacturing low-density crackers making use of standard pressure-baking technology. The Quaker document shows vertical alignment of support axis and driven shaft for the respective upper and lower dies, which is usual in apparatuses with fixed central mould and pneumatically driven upper and lower dies.

The prior art, however, is silent on (concrete) hydraulic drives for apparatuses as disclosed in the above mentioned Pels and Quaker documents. Indeed, "direct" hydraulic drives were commonly considered to be inadequate for two main reasons: on the one hand an intrinsic risk of hydraulic oil spoilage and possible oil contaminations, which is totally unacceptable in the food industry, and on the other hand the fact and conviction that hydraulic cylinder are normally too slow for accommodating the very high (explosion-like) expansion speeds in puffing cereal materials.

The present invention circumvents the possible oil contamination problem by providing only one hydraulic drive and arranging it below the granular-food containing mould cavity.

The object of the present invention is to avoid the drawbacks of prior art devices and processes in producing expanded crackers. A further object of the invention is to improve productivity and flexibility of existing cracker manufacturing technology and to render the machinery less cumbersome and more reliable.

These and other objects are achieved by the present invention in proposing the combination of a three-part mould, which is part of a previous development by the present inventor, and of a novel apparatus drive and process control concept, designed for being capable of providing a direct drive actuation and enabling a quick expansion response, which expansion is moreover adjustable to a precise variable extent This concept allows the economic production of a broader range of "customized" puffed snack products, while retaining for each product the required consistency in shape and quality together with the incorporated desired special properties.

Furthermore, the machine operation remains simple whilst the compact apparatus itself allows flexibility and yet mass production of different kinds of expanded products, and this in circumstances of high technical reliability and economic competitiveness.

BRIEF SUMMARY OF THE INVENTION

Accordingly the invention proposes a puffing apparatus comprising a heatable mould formed by the combination of a heatable upper die element, a ring die or peripheral die element and a heatable lower die element, which die elements are operatively connected so as to cooperatively define therein a pressure-baking mould and an expansion chamber, the improvements wherein the upper die is a stationary element forming a pressure support and/or receiving-guiding means for the ring die, bolt upper die and ring die defining a mould cavity being open ended in the downward direction, said ring die or annular element being vertically moveable in an upward direction and in a downward direction away from the stationary upper die, and wherein the lower die element is a heatable punch directly supported and driven by a hydraulic jack mounted vertically in line with said moveable punch, and wherein said hydraulic jack comprises at least one cylinder piston element and means enabling controllable differential displacement of said at least one piston element when moving in the upward direction relative to moving in the downward direction.

This unique direct operative combination of die elements and hydraulic jack, is neither taught nor fairly suggested in the prior art. The major advantage of the innovative drive and control concept is the ability of simultaneously and/or separately controlling the chamber volume in amount and rate of volume change by simply, acting on (at least) the following two expansion-defining parameters: "displacement length and displacement speed". This control occurs in a direct and accurate manner by means of the direct drive connection of the die punch with a hydraulic jack of appropriate cylinder/piston lay-out, preferably having an inner construction as depicted in FIG. 4 described hereinbelow. In addition the apparatus of the invention provides the intrinsic mechanical and operational benefits associated with the use of the combined die means of a fixed upper die and a moveable ring element for constituting the upper wall and peripheral walls of the mould cavity defining the baking-expansion chamber, see in this connection U.S. Pat. No. 5,102,677 and U.S. Pat. No. 5,467,693 assigned to the same inventor as the present application, the technical content of which is incorporated herein by reference, at least to the extent of the three-part mould designs and their related apparatus assemblies.

A novel process and product feature of the present invention concerns its ability to provide puffed snacks with an adaptable expansion and texture property, thereby taking into account the intrinsic expandability of the used food raw material, which depends on cereal type, starch percentage, grain size, moisture content etc., which expandability may further be affected or adapted by a given formulation mix of base ingredients and by certain pretreatments of the raw food material prior to cracker puffing, e.g. grain pretreatments such as wetting, steaming, parboiling etc. with different degrees of pregelatinized starch, premix conditioning in pellet form incl pellet composition, predeformation of granular feed, amount of broke etc.

Although the macro-form and dimensions of a puffed cracker are greatly determined by the die chamber shape, this in combination with the (preset) adjustable expansion volume of the die chamber and the amount and kind of raw material filled into the die cavity, it is a particular merit of the present invention to allow control/adjustment of desired form and quality in a more efficient and consistent manner. In addition any desired adaptation of e.g. texture, density and form of the outer surfaces of the finished cracker (including flatness, relative waviness, porosity, roughness, dimple pattern and the like) is instantly available by acting on a few adjustment parameters like pressure, displacement length (expansion volume) and retraction velocity (expansion speed) to a required optimum extent, which is readily tried out by changing the preset regulation values of the hydraulic jack parameters.

For instance a free or quasi unconstrained downward expansion, which gives rise to an irregular cracker surface aspect, may in one case be intensified or in another case be dampened, or it may partially be reversed to constrained expansion by adapting the machine settings for expansion volume (retraction positions of lower die versus height of ring die) and for regulating downward drive speed (punch retraction velocity vs. actual expansion speed) of a cylinder piston in combination with and/or in response to a given or varying quantity of food raw material filled into the baking mould.

Another big advantage and innovative aspect of the present invention is the possibility to give the materials which are pressure-baked in the mould cavity one or more precisely controllable intermediate expansions and/or controllable recompressions, thereby creating a different product as compared when working without intermediate expansion(s) and recompression(s). The thus generated products with intermediate expansion(s) and recompression(s) will give in most cases a thinner, crispier and far more distorted and irregularly shaped cracker or snack product The above and other objects, peculiar features and advantages of the invention will become more apparent from the description of a few exemplary embodiments of the invention.

BRIEF DESCRIPTION OF THE DRAWINGS

FIG. 1 illustrates the basic process steps of producing a puffed cracker according to the invention.

FIG. 2 shows a front view of an apparatus embodiment of the present invention.

FIG. 3 shows a side view of the apparatus with feeding device, product discharge chute and hydraulic power system.

DETAILED DESCRIPTION OF THE INVENTION

Figure 4:
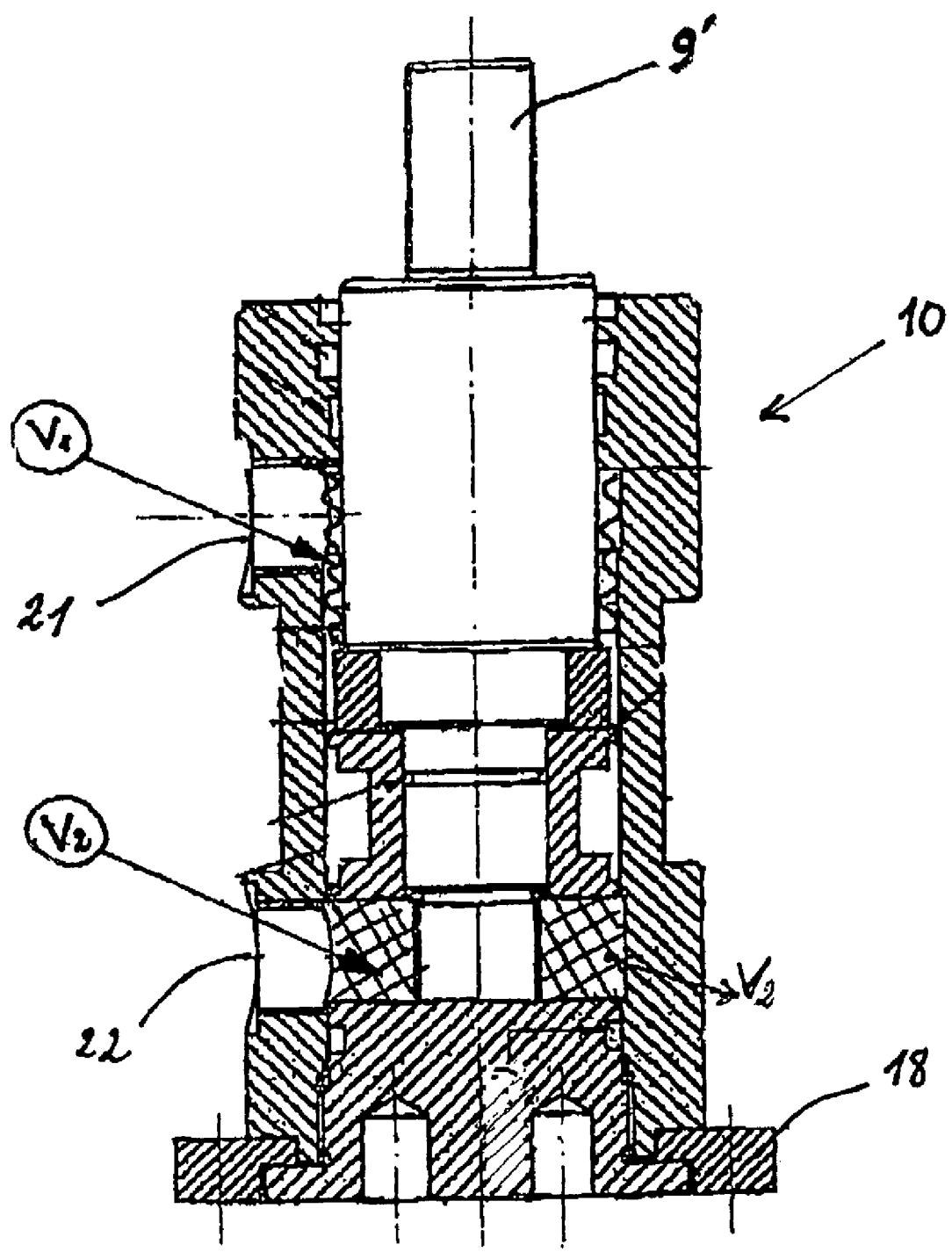
FIG. 4 shows a hydraulic cylinder jack suitable for driving the lower die or punch.

Referring to FIGS. 2 and 3, there is shown a preferred constructive lay-out of the apparatus according to the invention. The exemplified apparatus shows a multi-die arrangement for the production of a plurality of crackers with a single drive for the common moulding unit. A heated stationary upper die plate 1 having a plurality of fixed downwardly directed die elements 2 is mounted to an upper part of the apparatus frame 20. Vertically spaced below fixed plate 1 there is provided a heated die plate 3 with multiple upwardly directed punch elements 4, which punch plate is supported on a movable carrier element 5. Fixed die elements 2 and movable punch elements 4 are disposed accurately in line. A movable ring mould element 6 is arranged between die plates 1 and 3, and comprises a plurality of die holes 7 which are in registry with the upper die heads 2 and also with lower punch heads 4. In FIG. 2 said ring die is shown in a lower position wherein it rests onto movable die plate 3 such that the punch heads 4 are slidably penetrating the die holes 7. The up and down movement of the ring mould plate 6 is actuated by cylinder elements 8 fixed to an upper frame plate of the apparatus. The movable support 5 of the lower die plate is directly carried by the drive shaft 9 of a hydraulic jack 10, typically a cylinder unit with double action piston which is operatively linked with a hydraulic power system 11 by means of oil-pressure feed and return lines incl. suitable valves assembled as a unit 16 close to the oil reservoir 17 of the hydraulic power system. Upon actuation of the hydraulic power unit drive shaft 9 of the cylinder piston will be selectively displaced in the vertical direction following a cycle of desired upward and downward movements, including temporary stops as prescribed and controlled by a PLC unit of the apparatus connected with operator panel 15.

In FIG. 3 numerals 12 and 13 indicate the raw material storage container and the feeding slide for supplying starch raw material to the baking mould. The finished puffed snacks are discharged via a chute 14 into a product bin or a conveyor belt 14'.

The hydraulic jack or drive cylinder 10 is fixed on a lower beam or plate of the apparatus frame, such that its cylinder axis is substantially in vertical alignment with the central axis of the multi die moulding plates 1 and 3.

On the front side of the apparatus a control and steering panel 15 is provided, by which the required production cycle settings are effected and adjusted. In addition the heating of die plates 1, 3 is controlled and actual baking temperatures are monitored. The PLC-unit (not shown) connected with steering panel 15 may include standard programs with preset temperature, tuning and hydraulic system parameters for performing a number of different typical processing cycles according to the schemes of FIGS. 1,5-9.

The operational sequence and more detail of the actual die movements may be better understood with reference to FIG. 1.

In stages (1) and (2) the cracker discharge and the feeding of grainy material in the baking mould is illustrated. The sliding plate 13 loaded with raw material 15 enters in stage (1) the gap between fixed die element 2 and movable punch element 4, the latter being then in a (lowered) cracker push-out position where the punch top surface extends just above the upper rim of the equally lowered ring die 6, such that a puffed cracker is pushed away (see stage 6) by feeding slide 13. In stage (2) the punch is moved downwards so as to form, within ring die hole 7, a grain filling cup into which feeding slide 13 supplies a required amount of grainy material 30. In stage (3) both the lower die and the ring die are moved upwards and the grainy material is heated and compressed between the hot heads (2,4) of upper die and tower punch defining then a sealed die cavity together with the ring die. This baking position is maintained for a few seconds to gelatinize and render amorphous the starch-containing grain material or cereal mix or pellet material and the like.

In stage (4) the ring mould is kept in its raised position sealed against upper die head 2, but the punch is quickly moved towards a lower position still confined within the ring, thereby defining a predetermined expansion volume. As a result of the sudden pressure drop the gelatinized and heat-softened material together with released gases (steam) will explosively expand in the downward direction so as to form a self-sustaining puffed cracker 30'. In stage (5) the ring die is lowered over the punch head 4 towards to mould opening position wherein the cracker resting on the punch head can be discharged by the feeding slide 13 as depicted in stage (6) of the process sequence.

Crucial to the desired cracker type and quality is the adjustment of the expansion volume and the realisable optimum retraction velocity of the movable punch in stage (4). A full and free grain expansion can be obtained when the preset expansion volume is not lower than the max. Expansion potential of the hot-compressed grainy mass and the downward velocity of the retracted punch head is not substantially smaller than the velocity of the propagating material expansion front. A full but partially constrained expansion is obtained when the preset expansion volume is sufficient but the expanding material propagates much quicker than the descending speed of the punch, i.e. the expansion front constantly hits/pushes the moving punch descending at a relatively slower pace.

Machine settings corresponding with smaller expansion volumes than needed for full potential (free) expansion volumes will give rise to puffed crackers of relatively greater density but featuring a greater bonding strength and a flatter outer surface than freely expanded crackers.

In this connection it is to be understood that covering and carrying out the complete range of possible expansion degrees, varying from "full and free" expansions to the other extreme of "partial and/or fully constrained" expansions is not possible with known puffing apparatuses having conventional drives and controls.

The apparatus and method of the present invention renders this goal feasible, in that for a plurality of desirable cracker qualities the apparatus settings in terms of expansion volume and required punch speed are sufficiently ample, accurately adjustable and simple to accomplish with the novel drive and control concept. The first one of said two parameters is readily adjustable by: selecting/presetting the end position of the retracted punch relative to the ring mould, optionally in combination with a selected enlarged height dimension of the movable ring die and/or in combination with an upper position adjustment of the ring die relative to the upper die head 2. The second expansion parameter is rendered possible and controllable by use of a direct connection and drive actuation between "only one" downwardly movable punch element pressed against a stationary upper mould, whereby punch retraction velocity is further adjustable by adapting the inner design of the cylinder/piston unit, in particular by adaptations with respect to relative oil quantities to be displaced and by throttling or anti-damping measures, including optimized valve actuation and response velocity.

The novel apparatus concept has the additional advantage of being sustained by gravity forces, i.e. the weight of lower mould element and its supporting carrier, which both sustain downward movement of the punch.

Moreover the apparatus having only one pressure-driven mould element needs but a single drive, which by being designed as a directly connected cylinder/piston unit surprisingly and remarkably simplifies machine operation and required settings, including adjusting and controlling the same. This renders the apparatus less expensive but at the same time more reliable in use.

The settings and control measures in terms of selected hydraulic drive parameters include: actuation sequence and timing of piston and piston stroke control with displacement detectors and/or switches. In this connection an instant response of the punch to the selected process cycle (PLC, piston stroke timing and distances) may be further improved by an optimum oil flow arrangement (inflow and return flow) within the cylinder unit and from cylinder to the hydraulic power system, preferably sustained by appropriate quick-action valve means disposed on the power generation/pump unit close to the cylinder or otherwise mounted directly on the cylinder drive unit. Said features shorten response time of the apparatus and sustain expansion control accuracy.

FIG. 4 shows a preferred design of a single piston type hydraulic unit 10 suitable for directly driving the lower mould or punch 3. The piston shaft 9' is directly linked with connection/support element 9 of the lower die carrier element 5. Oil ports 21 and 22 allow connection with pressure oil feed lines from the hydraulic power unit and/or return lines to the oil reservoir 17 including a pump and pressure regulator. Suitable valves, e.g. 4/3 type valves of quick-switching electromechanical or electromagnetic type are actuated in the desired switch position (see FIG. 5) according to the PLC-controlled cycle steps (1) to (6) of figure T for steering pressure oil to and returning oil from the respective cylinder piston chambers.

As can be seen from FIG. 4 the cylinder-piston is of a stepped or graded construction such that oil volumes V1 and V2 to be displaced in the upper and lower chamber of the cylinder are designed to be greatly different. When the cylinder piston has been brought in the raised position (pressure-baking) the return expansion stroke thereafter requires a quick piston movement and thus a fast outflow of oil, the latter being enhanced by providing volume V1 small in relation to the corresponding stroke length. (PLC-controlled in combination with valve actuation), thereby controlling piston relative velocity versus expansion speed and volume.

Figure 5:
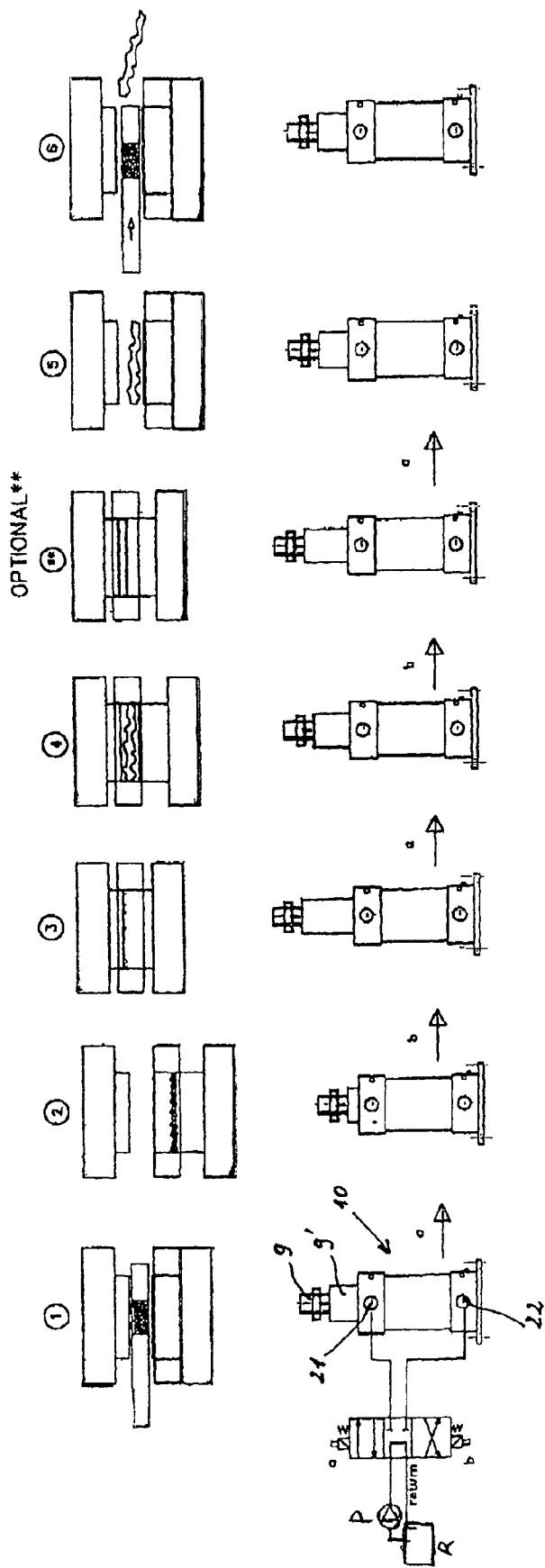
FIG. 5 illustrates a first operative drive-embodiment of the invention.

FIG. 5 illustrates a process sequence as schematized in FIG. 1, put into practice with a drive unit cylinder 10 according to the design of FIG. 4.

At the left side of the figure there is schematized a suitable oil circuit and valve arrangement (switch positions a,b) between the hydraulic power system (pump P and reservoir R shown) and direct drive unit 10. This processing embodiment allows free expansion at high speed with suitable parameter settings, but is also adjustable to gradually more confined conditions of expansion.

Figure 6:
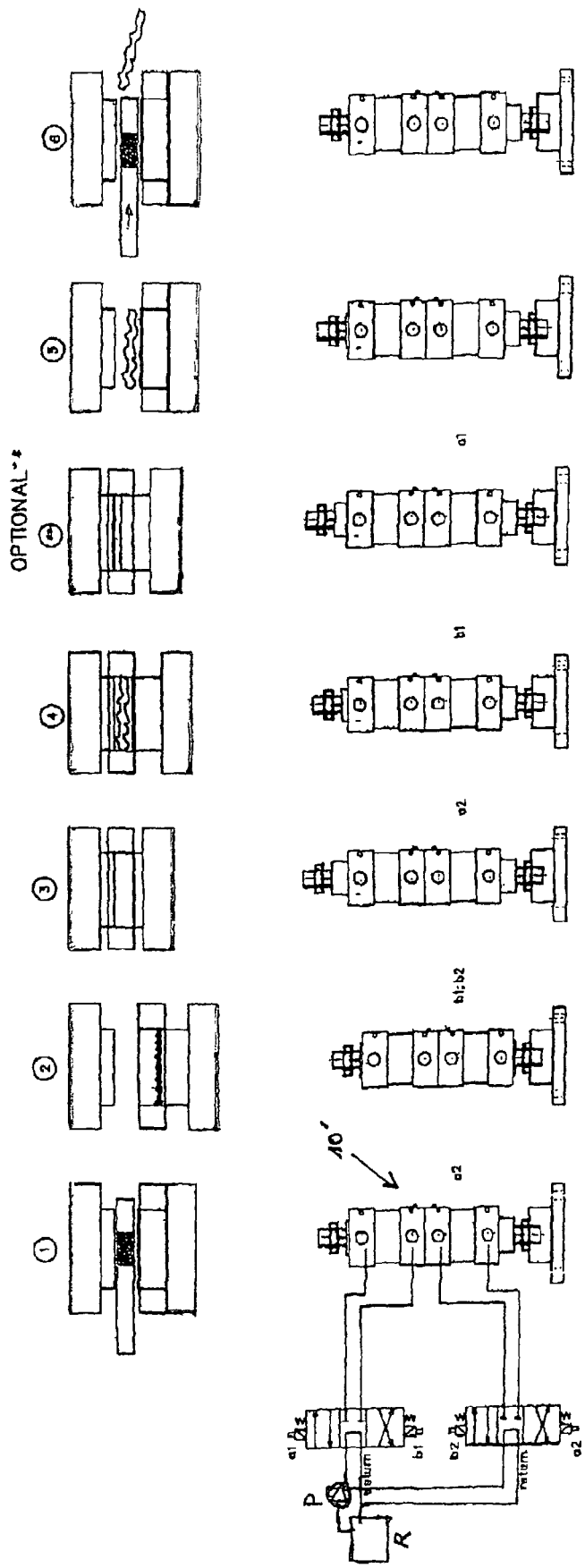
FIG. 6 illustrates a second operative embodiment of the invention.

FIG. 6 illustrates the same process sequence but in this case the direct hydraulic drive unit is designed as a double piston/cylinder unit This direct drive embodiment allows a precise control of the thickness of the expanded cracker, since the preset expansion volume can be perfectly and accurately maintained by giving one of the two cylinder pistons a fixed return position. This second embodiment thus has the benefit of a high expansion speed while simultaneously enabling a precise control of the desired thickness of the expanded product.

In both embodiments an optional cracker dimension equilibration step (**) may be provided between step 4 and 5.

Figure 7:
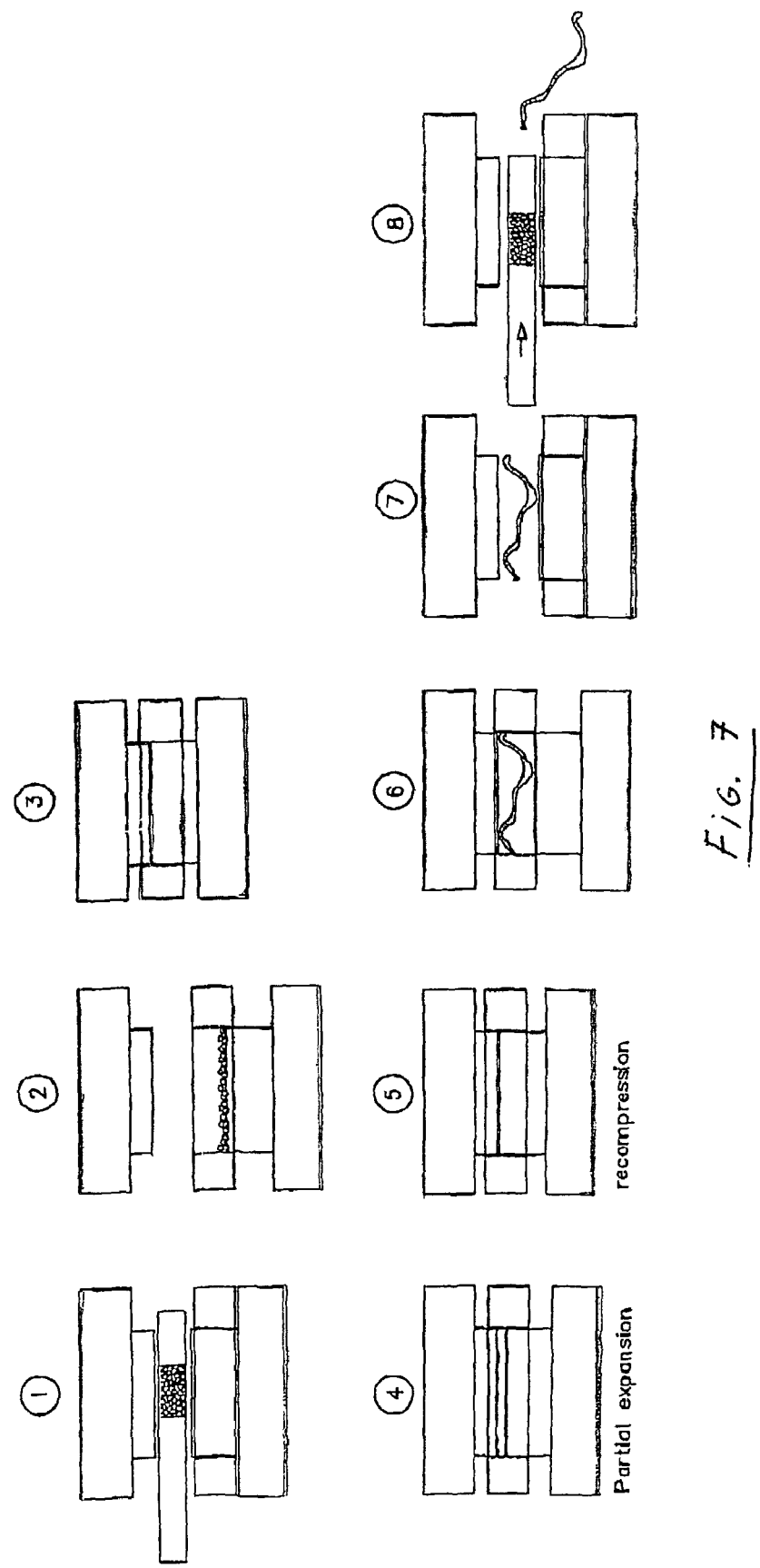
FIG. 7 exemplifies the basic process steps for producing a thin irregular cracker product.
Figure 8:
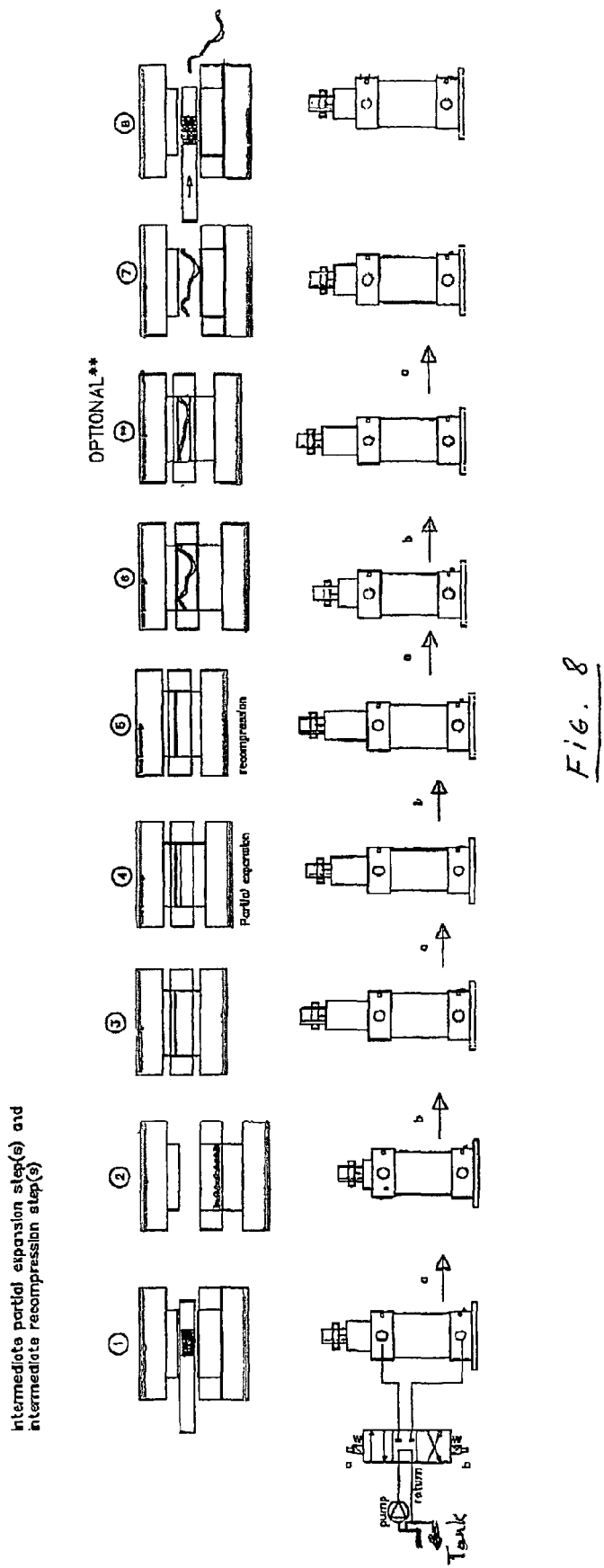
FIGS. 8 and 9 illustrate a first and a second alternative of an operative embodiment for producing a thin irregular cracker according to the invention.
Figure 9:
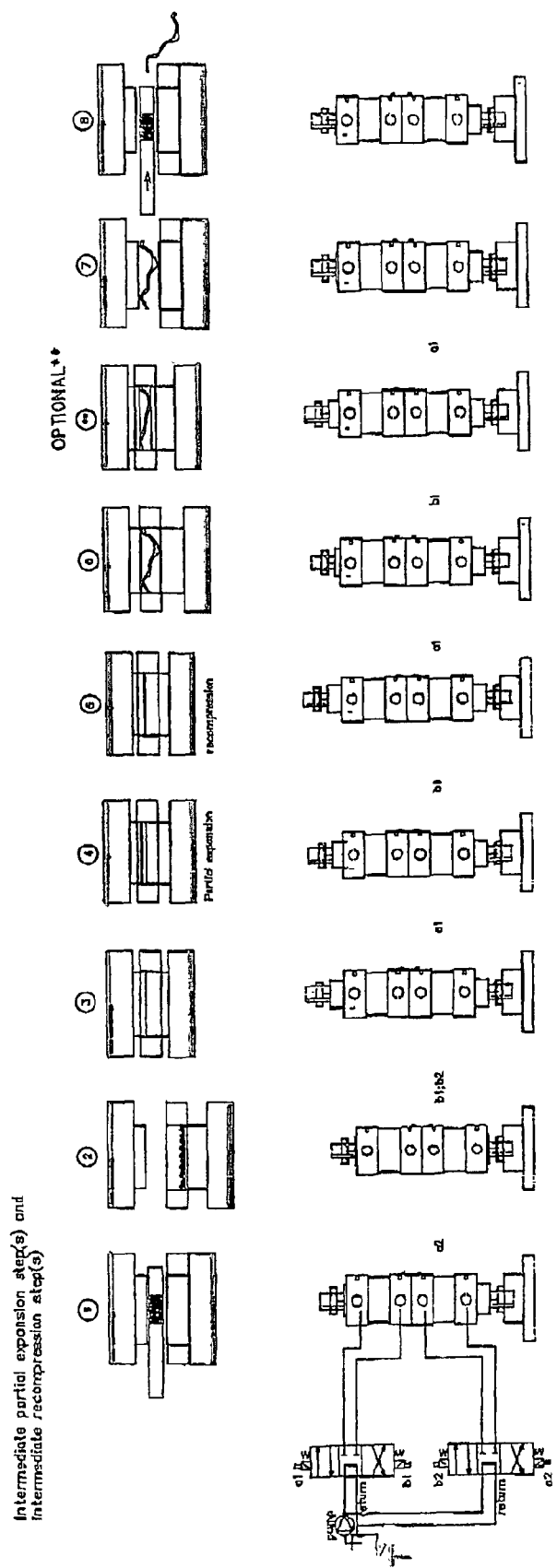

In FIGS. 7 to 9 the process cycles shown in FIGS. 1,5,6 are extended and accordingly further optimized by incorporation of an intermediate partial expansion step (4) followed by an intermediate recompression step (5) prior to final expansion step (6) as schematized in FIG. 7. As can be seen the fully expanded product obtainable by the process cycle of FIG. 7 can be made into an irregular chip-like product of high crispiness, while the product from the process sequence according to FIG. 1 has a more regular cracker form with irregular, coarse surface dimples.

FIGS. 8 and 9 are illustrative of two operational apparatus alternatives for carrying out the process cycle of FIG. 7.

As a matter of fact the puffing apparatus with direct hydraulic drive of only the movable lower die element according to the present invention can be concretized in two main embodiments differing in hydraulic cylinder design and corresponding steering program. In the first group of embodiments according to FIGS. 1, 4, 5, 7, 8 a single cylinder unit is proposed, which is most suited for producing freely expanded snacks of various forms, where (precise) control of snack thickness is not essential but wherein expansion velocity is important. This embodiment enables manufacture of thin and crispy products of irregular shape similar to fried chips, but is also suitable for mini crackers of variable thickness and surface texture. The second group of embodiments, especially according to FIGS. 6, 9, makes use of precise control of expansion thickness. The obtainable puffed snacks may vary from uniform cake or wafer products of constant thickness including flat surfaces to very wavy and less regular crackers depending on selected expansion conditions.

In the above description and related drawings there have been described what is presently believed to be preferred embodiments of the invention. However, those skilled in the art will realize that changes and component modifications may be made thereto, such as for instance in the design of the mechanical components, the cylinder/piston unit and valve arrangements and the control means (PLC etc.), without departing from the innovative basic concept of the invention. It is intended to cover all such apparatus modifications and combinations that fall within the true scope of the invention as defined in the appended claims.

The invention claimed is:

1. An apparatus for making puffed crackers from a starch-containing raw material by pressure-baking and expanding the raw material within a heated mould, said apparatus comprising:
   a) a heatable stationary upper mould plate having extending therefrom and stationary therewith one or more downwardly directed upper die elements, said upper mould plate is adapted to be adjustably fixed to an upper frame end of said apparatus;
   b) a heatable lower mould plate having one or more upwardly directed die or punch elements arranged in registry with said one or more downwardly directed upper die elements, said lower mould plate is adapted to be moved upwardly and downwardly relative to said stationary upper mould plate and having a carrier member movable therewith;
   c) an optionally heatable intermediate mould plate disposed between said upper mould plate and said lower mould plate and having one or more die holes arranged in registry with said one or more downwardly directed upper die elements and said one or more upwardly directed die or punch elements, said intermediate mould plate is adapted to be moved upwardly and downwardly relative to said upper mould plate and said lower mould plate such that either one or both of said downwardly directed upper die elements and said upwardly directed die or punch elements are caused to be slidably received in said one or more die holes so as to define mould cavities therein;
   d) means for driving and expanding said heated mould, said driving and expanding means is directly connected to said lower mould plate for moving the same and comprises one or more hydraulic cylinder piston unit mounted beneath said lower mould plate, said one or more hydraulic cylinder piston units having a drive shaft connected to said carrier member of said lower mould plate and said drive shaft and carrier member are disposed vertically in line and with the longitudinal axis of said apparatus; and
   e) said hydraulic piston cylinder units having stepped interior chambers of different volume to selectively vary the flow of hydraulic fluid therefrom whereby the velocity of the piston cylinder units is caused to be moved in a downward direction at a rate greater than in an upward direction following baking of raw material within said heated mould.

2. An apparatus according to claim 1 wherein the one or more hydraulic cylinder piston units comprises two vertically aligned hydraulic cylinder piston units.

3. An apparatus according to claim 1 and further comprising means for adjusting and controlling an expansion volume for said pressure-baked product within said heatable mold.

4. An apparatus according to claim 1 and further comprising means for controlling the retraction velocity of said one or more piston cylinder units from said lower punch plate.

5. An apparatus according to claim 1 wherein said one or more cylinder piston units including an upper oil port and a lower oil port, and two respective oil lines connecting said oil ports alternately to a high pressure oil source and to an oil return reservoir of a hydraulic power system of said apparatus, said two oil lines passing through a valve unit capable of simultaneously switching the oil lines alternately to a high pressure oil feed pump and to an oil return reservoir.

6. An apparatus according to claim 1 and further comprising a hydraulic power control and steering system operatively associated with said cylinder piston unit and an actuating means for moving said peripheral mould, wherein said cylinder piston unit is displaced in a desired direction over a predetermined stroke length by oil flow under pressure acting selectively on either side of said cylinder piston unit, said pressurized oil flow is delivered from said hydraulic power control and steering system by selective actuation and positioning of a multi-position valve, through which passes a first oil feed line to an upper chamber of said hydraulic piston cylinder unit and a second return oil flow line from a lower chamber of said hydraulic piston cylinder unit, said two oil flow lines are adapted to be selectively switched to pressurize or return hydraulic fluid flow according the position of said multi-position valve.

\* \* \* \* \*